Dec. 21, 1943.   H. W. BUELL   2,337,445
ABRASIVE ARTICLE AND METHOD OF MAKING SAME
Filed Dec. 16, 1941   2 Sheets-Sheet 1
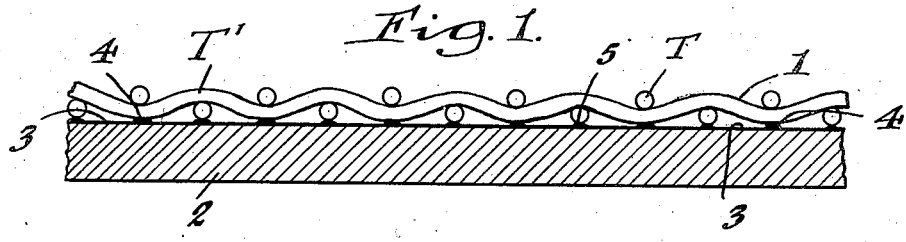
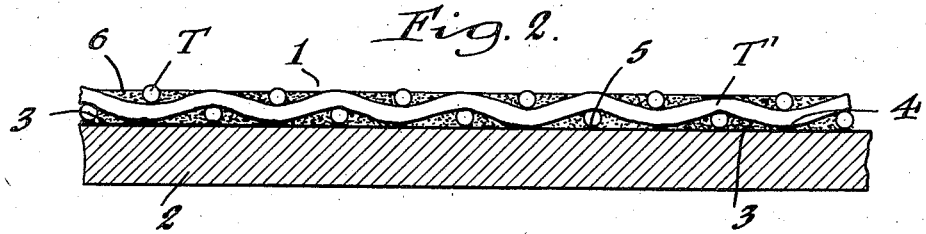
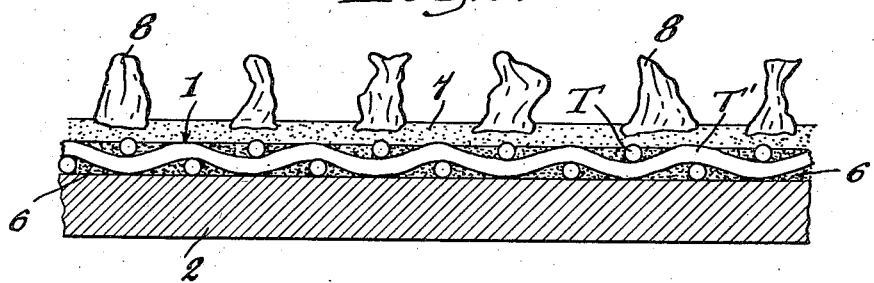
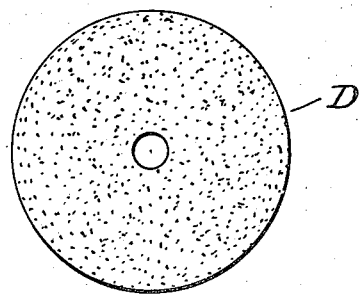
Inventor
HALSEY W. BUELL
by R. C. Burnes
Attorney

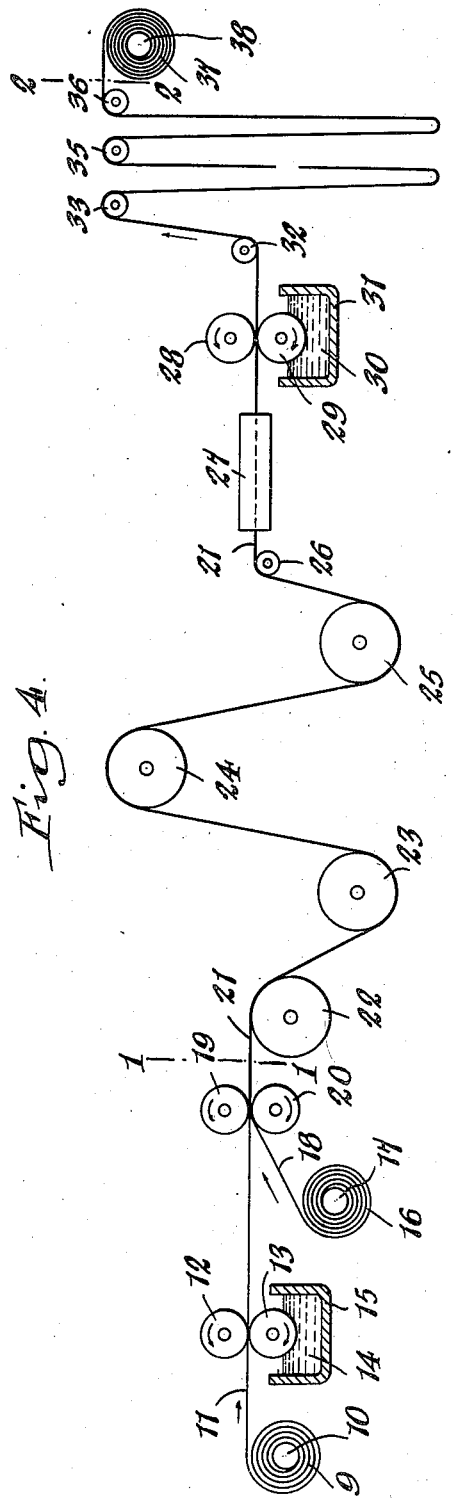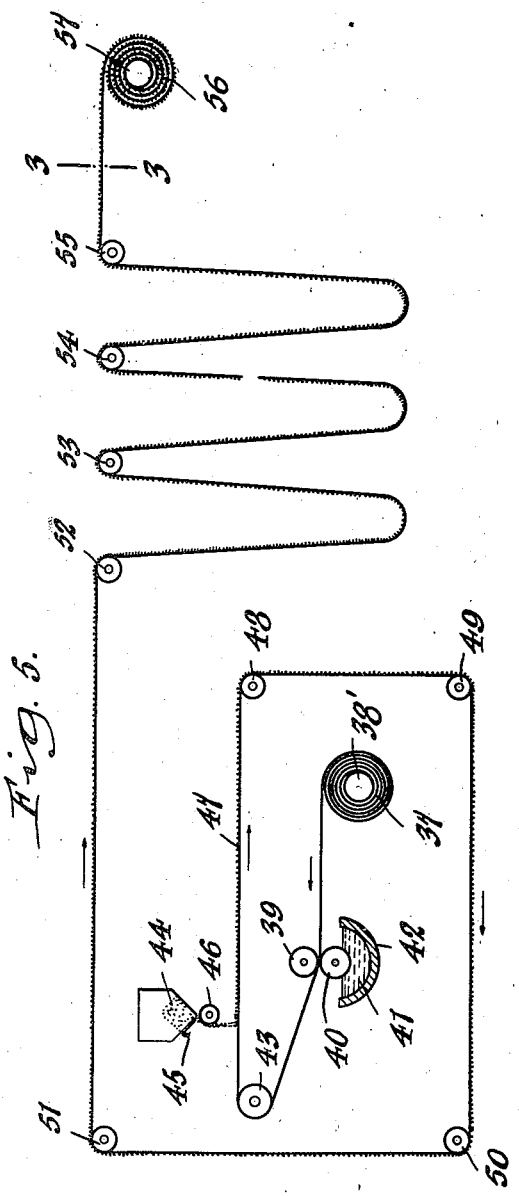

Patented Dec. 21, 1943

2,337,445

UNITED STATES PATENT OFFICE

2,337,445
ABRASIVE ARTICLE AND METHOD OF MAKING SAME

Halsey W. Buell, Niagara Falls, N. Y., assignor to The Carborundum Company, Niagara Falls, N. Y., a corporation of Delaware Application December 16, 1941, Serial No. 423,132

12 Claims. (Cl. 51—297)

This invention relates to improved coated abrasive articles and to backings for use therein.

The object of the invention is to provide an improved coated abrasive and a method of making it. The invention has utility in the manufacture of abrasive belts, abrasive cones, and other coated abrasives, and has particular utility in the manufacture of flexible but comparatively stiff abrasive discs of the type used in connection with apparatus described and claimed in the United States Patent to Stratford, No. 1,648,663. Such abrasive discs are employed, for example, in smoothing metal surfaces, as for instance, where such surfaces are welded, although they are also used to some extent for finer abrading operations such as the smoothing of automobile fenders.

In the past, discs of this type were made almost exclusively on a backing consisting of a layer of comparatively stiff cellulose material having a layer of cloth attached thereto and a layer of abrasive grains attached to the exposed surface of the cloth, the adhesive for joining the two layers of the backing and for attaching the grains being hide glue. More recently discs of this general type have been made with ordinary phenol-formaldehyde condensation products as adhesive for attaching the grains and for joining the two layers of the combination backing. In a further improvement in the making of the backings for such discs, a layer of stiff cellulose material is attached to phenolic resin sized or impregnated cloth by a layer of a phenolic resin. The discs made by these two latter processes have a much longer life than those employing glue.

The process, described briefly above, employing a phenolic resin as the laminant between the sheet of cellulose material and the phenolic resin sized or impregnated cloth, is not entirely satisfactory. The adhesive properties of phenolic resins in the uncured state are not very good. The phenolic resin employed as the laminant between the sheet of cellulose material and the phenolic resin sized or impregnated cloth cannot, however, as a practical matter, be cured to the extent necessary for it to develop good adhesive properties before the combined backing material has passed through the machine for applying the making coat of adhesive, the coating of abrasive granules, and usually, a sizing coat on the granule-coated side. This is due to the fact that when the phenolic resin laminant is cured, the phenolic resin employed as the sizing or impregnant in the cloth becomes cured at the same time. This renders the combined backing material so stiff that it cannot be fed satisfactorily around the various rolls necessarily employed in the adhesive and abrasive applying machine.

It has been the practice, therefore, to leave the phenolic resin laminant in the uncured state until the backing has passed through the machine. Because of the aforementioned poor adhesive properties of the phenolic resin in the uncured state, however, the combined backing material frequently develops wrinkles and puckers in its passage through the machine, caused by the separation of the cloth and the sheet of cellulose material.

The present invention eliminates the difficulties of combining the comparatively stiff sheet of cellulose material and the layer of cloth; after the cellulose material and the cloth are combined, they remain firmly attached to each other so that the combination backing material may be fed through the subsequent operations in the adhesive and abrasive applying machine and remain free from wrinkles and puckers.

The method consists, briefly, in combining an unsized cloth with a comparatively stiff sheet of cellulose material, using as a laminant a very thin layer of adhesive applied on one side of the stiff sheet of cellulose material. This adhesive is one which sets quickly to a good strength and, when it becomes set, does not render the combined backing material too stiff to be fed through the machine satisfactorily. Such adhesive may be, among others, a urea-formaldehyde condensation product, an animal hide glue, or a phenolic type resin such as the condensate resulting from reaction between resorcinol and formaldehyde.

The cloth is pressed against the coated surface of the sheet cellulose material, and the resulting combination sheet is heated to dry the adhesive, and if it is of a type requiring it, such as the urea-formaldehyde condensation product, to cure it to good strength. The cloth side of the combination is now impregnated with a suitable impregnating material, as, for example, a liquid phenolic resin, in order to stiffen the backing suitably and to further bond the cloth to the sheet of cellulose material. The impregnating resin is dried, the thus treated backing material is subsequently coated on its cloth side with a making coat of suitable adhesive, such as a phenolic resin, a coating of abrasive granules is applied to such adhesive, and the coated web is treated to dry the making coat and to partially cure the impregnating resin and the making coat.

A sizing coat of resin is then applied over the abrasive grains and the web is then heat-treated to cure the resin coatings. The abrasive-coated material may then be cut into pieces of desired shape to make abrasive belts, discs, cones, etc.

The invention will be more readily understood by reference to the accompanying drawings, in which:

Fig. 1 is an enlarged cross-sectional view of a sheet of stiff cellulose material having the cloth layer joined thereto by a thin layer of quick-setting adhesive, taken on line 1—1 of Fig. 4;

Fig. 2 is a similar view of the cellulose material and cloth, after the cloth has received an impregnating layer of adhesive, taken on line 2—2 of Fig. 4;

Fig. 3 is a similar view of the combination backing after it has received a making coat of adhesive and a layer of abrasive granules, taken on line 3—3 of Fig. 5;

Fig. 4 is a diagrammatic side section of apparatus suitable for use in carrying out certain steps of the invention;

Fig. 5 is a diagrammatic side section of apparatus suitable for use in carrying out further steps of the invention; and Fig. 6 is a plan view of an abrasive disc, made in accordance with the present invention.

Referring to the drawings, Fig. 1 shows somewhat diagrammatically a sheet 2 of cellulose material and a layer 1 of cloth joined thereto by a thin layer of quick-setting adhesive 3 applied in liquid easily mobile condition. The sheet 2 may be made, for example, from highly hydrated wood pulp, either chemically or mechanically hydrated, so that after such pulp is pressed and dried, the individual fibres have substantially lost their identity. Such material is referred to hereafter in this specification and its appended claims as being made of "vulcanized fibre." The cloth is shown, by way of example only, as composed of one course of threads T' and two cross courses of threads T. It is obvious that other types of cloth may be employed if desired. For reasons of clarity of illustration, the threads T are shown somewhat more spread out than they actually are in the cloth. It will be apparent that the cloth 1 contacts fibre 2 at spaced points only, such as those shown at 4 and 5. Because of the small quantity of adhesive used for coat 3, it soaks into the threads only at their points of contact 4 and 5 with the fibre, and in the immediate vicinity thereof, and by so doing draws some of the highly mobile adhesive 3 on the fibre from areas not contacted by the threads of the cloth, thus reducing the thickness of adhesive on those areas to a very thin film. The cloth is left open, uncoated, and not sized or impregnated except at these points. At the same time, the character of adhesive 3 is such that the cloth 1 is firmly attached to the fibre 2 after the two are pressed into contact and remains so during and after curing or setting of adhesive 3.

Fig. 2 illustrates the article shown in Fig. 1 at a later stage in its treatment. The cloth 1 has now received a rather heavy impregnating coat 6 of a phenolic resin, applied in liquid condition and dried to drive off volatile material and advance the resin to a solid condition. This coat 6 seeps through the cloth 1 into contact with the thin film of adhesive 3 on areas on the face of fibre 2 at all points except those previously attached to fibre 2 by adhesive 3, and when cured, further bonds the cloth to the fibre sheet. The temperature at which the impregnating coat 6 is dried is low enough so that adhesive 3 is not decomposed thereby.

Fig. 3 shows the article illustrated in Fig. 2 in a later stage of its treatment. The combination backing consisting of the fibre, cloth, and cloth impregnating layer has now received a making coat 7 of phenolic resin, applied in a liquid condition, and a layer of abrasive granules 8. The making adhesive coat and the impregnating resin have been dried and the combining resin 3 has been cured. In an analysis of the finished coated abrasive, no distinct layer of adhesive 3 is found. When the coated article is shaved down in successive cuts through the fibre, said cuts being parallel to the upper face of the fibre, the cloth is found to be joined to the fibre over substantially all its area by the phenolic impregnating resin. It appears probable that whatever adhesive 3 remains on the fibre, except at such points of contact, being very thin, becomes incorporated in the impregnating resin and its identity lost.

In Fig. 4, there is illustrated apparatus adapted for combining two layers of backing material. In this figure, sheet vulcanized fibre 11 is fed from roll 9, mounted on spindle 10, between adhesive roll 13 and pressure roll 12. The adhesive roll 13 is partially submerged in a body of adhesive 14, which comprises a urea-formaldehyde condensation product, contained in a container 15. The coated vulcanized fibre then meets a web of unfinished cloth 18 fed from roll 16, mounted on spindle 17. The coated fibre and the unfinished cloth are passed between pressure rolls 19 and 20, whereby the two layers of backing material are pressed together. The combination backing 21 is then led around drying rolls 22, 23, 24 and 25, heated, for instance, internally by steam, for the purpose of drying the adhesive coating. When the urea-formaldehyde resin is employed as adhesive 3, these rolls are heated to a temperature not exceeding 225° F. The backing may at this point be coiled and held at room temperature for a sufficient time to remove from the cloth layer a portion of the water lodged therein from the adhesive layer 3, or the backing may be heated to dry the cloth layer more rapidly. In the drawings, the latter procedure is shown as being carried out, the combination backing 21 passing over guide roll 26 into heating chamber 27, held at a temperature, for example, of 125–130° F. After emerging from heating chamber 27, the backing is passed between applicator roll 29 and pressure roll 28, for the purpose of applying an impregnating coating to the cloth side of the combination backing. Applicator roll 29 is partially submerged in the impregnating medium 30 contained in pan 31. The impregnating medium may be any known material suitable for the purpose of stiffening the backing and for further attaching the cloth to the fibre; one such material is a liquid phenolic resin. The combination backing is then passed around guide roll 32 and over festooning rolls, some of which are shown at 33, 35 and 36, and thence to drying racks, not shown, located in a heated chamber, after passage through which it becomes dry and then may be formed into coil 37 on spindle 38.

In Fig. 5 there is illustrated the coating of the combination backing of the present invention with abrasive grains. Referring to this drawing, the backing material, wound into a roll 37, is mounted on spindle 38', and fed, cloth side down, between pressure roll 39 and adhesive roll 40. Adhesive roll 39 is partially submerged in an adhesive 41 contained in pan 42. Rotation of roll 40 causes a coating of adhesive to be applied to the under side of the backing material; the moving material then passes around guide roll 43 and under a grain feed hopper 44. The hopper is provided with a gate 45 for adjusting the flow of abrasive grain to a grain feed roll 46. The abrasive grain fed from the hopper by the grain feed apparatus falls onto the adhesive-coated web, and the now abrasive-coated web 47 then passes around idler rolls 48, 49, 50 and 51 to a suitable festooning apparatus shown generally by rolls 52, 53, 54 and 55 located in a heated chamber, not shown. The festooning apparatus permits the holding of a relatively large quantity of coated material at a suitable temperature for a time sufficient to dry and cure the adhesive, after which the abrasive-coated article can be wound up into a roll 56 on spindle 57.

The abrasive-coated web may be later given an additional coating of adhesive to attach the abrasive grains more firmly to the backing by apparatus similar to that described in Fig. 4 or by other suitable means, as, for example, by spraying on a sizing coating with the conventional spray gun.

Fig. 6 illustrates an abrasive disc D cut from the finished combination backing coated with abrasive granules.

The invention will be illustrated by reference to several specific examples, it being understood that the examples are for illustrative purposes only and are not limitative:

Example 1

A backing suitable for use in the manufacture of abrasive discs is prepared by applying to one face of a sheet of a hydrated cellulose material commonly referred to as vulcanized fibre, substantially 0.010" thick, an adhesive consisting of:

100 parts by weight liquid heat-hardenable urea-aldehyde condensation product, such as the urea-formaldehyde resin sold under the trade name "Bakelite XRU-13,108." The urea resin is an aqueous suspension of a urea-aldehyde condensation product containing 65% solids.

10 parts by weight of a toughener such as that sold under the trade name "Bakelite XR-13,947," which is a solution of sorbitol phthalate in water.

10 parts by weight of a hardening agent, such as that sold under the trade name "Bakelite XKU-12,435," which consists of ammonium sulfate, thiourea and ammonium hydroxide.

The coating material is applied in a thin layer, in the ratio of 2–3 lbs. of the liquid to a sandpaper-maker's ream of the fibre (480 sheets 9" x 11"). To the adhesive-coated face of the fibre is joined by pressure an unsized cloth, such as a well-known type known as 2.58 Ohio Falls brown X drill. The combination backing is heated to dry the adhesive, and the composite backing is then held overnight at room temperature or heated for a short time at 125–130° F. to dry the cloth layer and set up the adhesive 3.

The combination backing is then treated to apply an impregnating material to the cloth side thereof. A suitable size is a liquid heat-hardenable phenol-formaldehyde resin. This is applied as a fairly heavy coating, from 12–20 lbs. per ream. The resin-impregnated backing is dried for 8–10 hours at 135° F., after which it is ready to receive the abrasive granule coating by applying a suitable adhesive material, such as a phenol-aldehyde condensation product, applying the granules, and drying the making coat and curing the impregnating resin and the making coat.

The urea-formaldehyde condensation product gives sufficient adherence between the vulcanized fibre and the cloth before the impregnating resin is cured to prevent separation of the laminations. The resulting product is stiff to a certain extent, but not too stiff for satisfactory use.

Example 2

A backing material suitable for use in the manufacture of abrasive articles is prepared in accordance with the method of Example 1 except that as the laminant material the following material is employed:

100 parts by weight heat-hardenable urea-aldehyde condensation product, such as "Bakelite XRU-13,108."

30 parts by weight of a plasticizer comprising liquid, water-soluble, alkyd type resin. A suitable plasticizer of this sort is that sold under the trade name "Bakelite XR-14,508."

10 parts by weight of a suitable catalyst or hardener, such as that sold under the trade name "Bakelite XK-14,616," which consists of an ammoniacal solution of ammonium sulphate, containing 22% free ammonia and 10% ammonium sulphate.

This adhesive is applied to the vulcanized fibre in the amount of 2–3 pounds per sandpaper-maker's ream, unsized cloth such as drill cloth is applied to the adhesive-coated side of the fibre and pressed thereon, and the adhesive dried and cured in the same manner as that in Example 1. The backing is subsequently impregnated on the cloth side with a phenolic resin in liquid condition in an amount of 12–20 pounds per ream, the impregnating material is then dried, a making adhesive coat and abrasive grains are applied to the impregnated cloth side of the backing, the making coat dried, and the making coat and impregnating layer are then cured, as in Example 1.

The procedure employed in the present example gives a stiff combination backing. The adhesive used for the first, thin coating on the fibre is slower in gelling than that employed in Example 1, but a small amount of heat sets the laminant up easily.

Example 3

A backing material suitable for use in the manufacture of abrasive articles is prepared in accordance with the method of Example 1 except that as the laminant material an animal hide glue is used. This is a 25% water solution of a dry glue sold under the trade name "Peter Cooper Z," and is applied in heated condition to the vulcanized fibre in the amount of 2–3 lbs. per sandpaper-maker's ream.

The cloth is joined to the glue-coated side of the fibre by pressing thereagainst, and the glue set either by air drying or by passing the combination backing around a roll or rolls heated not to exceed 110° F. and through an oven maintained at a suitable temperature to drive moisture from the cloth. The backing is then treated as in the foregoing examples, namely, by being impregnated on the cloth side with liquid phenolic resin, the impregnating resin dried, and a making adhesive coat and abrasive granules applied thereto. The animal glue is found to provide sufficient strength and to set quickly enough to hold the cloth firmly onto the fibre while the combination backing progresses through the coating machine until the impregnating phenolic resin becomes cured and further permanently bonds the cloth to the fibre.

*Example 4*

The materials employed and procedure followed are the same as in Example 1 except for the substance employed as the adhesive for holding the cloth and the vulcanized fibre together temporarily, and its manner of setting. In this procedure, a phenolic resin for this purpose is made in the following manner:

1 part of resorcinol is mixed with 1½ parts of a 30% solution of formaldehyde. The resulting solution is concentrated, under gentle heating at progressively rising temperature beginning at about 15° C. and ending at about 35° C., under a vacuum of about 20 mm. of mercury. The condensation product so obtained has the appearance of a transparent syrup. This condensation product is applied to one side of the vulcanized fibre as a thin coating of about 2-3 lbs. per sandpaper-maker's ream, the unsized cloth is pressed thereon, and the combined cloth and vulcanized fibre is heated as by passage around heated rolls to cure the condensation product to such an extent that it passes through the weak sugary stage and reaches the C stage condition in which it is tough and strong.

While the invention has been described with particular reference to certain specific examples, it will be understood that other equivalent materials may be employed, together with other modifications and embodiments common to the art. Thus, the backing may be composed of two layers of cloth and one layer of the stiff cellulose or fibre material, the latter being joined to each layer of the cloth in the manner above described in connection with the joining of cloth to one side of the fibre. Furthermore, as the temporary adhesive applied to the fibre in a thin layer for the purpose of joining the cloth and fibre sufficiently to prevent their pulling apart until the cloth impregnating material has been cured sufficiently to bond cloth and fibre together, there may be employed other adhesives, such as casein, which will set to good strength sufficiently fast under heat to accomplish the desired purpose. The invention is therefore not to be restricted to the specific steps and materials herein described, but rather is to be considered as of the scope defined in the appended claims.

I claim:

1. A method of manufacturing a composite abrasive article which comprises first coating a sheet of vulcanized fibre backing material with a thin layer of a highly mobile adhesive which sets quickly to good strength, joining said coated sheet of vulcanized fibre to a layer of unsized cloth at a multiplicity of closely spaced points, causing said adhesive to set, and thereby attach the cloth and fibre material to each other so firmly that the combination backing material can be put through the subsequent coating operations without substantial separation of the cloth and fibre, then impregnating the cloth side of the combination sheet with a phenolic resin in thin liquid condition, and in such quantity that the resin seeps through the cloth and provides the principal bond for attaching the cloth to the fibre in the finished article, heating the impregnated combination sheet to dry the impregnating resin, applying a making coat of phenolic resin in liquid condition to the impregnated cloth, applying thereon a layer of abrasive granules, and heating the backing and the applied adhesive and granules to cure the impregnating resin and the making coat.

2. A method of manufacturing a composite abrasive article which comprises coating a sheet of vulcanized fibre backing material with a thin layer of heat-hardenable urea-formaldehyde condensation product resin in highly mobile liquid condition, joining said coated layer on its coated side with a layer of unsized cloth whereby the adhesive is drawn by the threads which contact the fiber material from the parts of the fiber not in such contact, heating the combination sheet to dry and cure the resin, and thereby attach the cloth and fibre material to each other so firmly that the combination backing material can be put through the subsequent coating operations without substantial separation of the cloth and fibre, impregnating the cloth side of the combination backing with a phenol-aldehyde resin in liquid condition so that the liquid resin wets substantially all the threads of the cloth and flows into intimate contact with the vulcanized fibre, heating the impregnated combination backing to dry the impregnating resin, applying a making coat of phenolic resin in liquid condition to the impregnated cloth, applying thereon a layer of abrasive granules, and heating the backing and the applied adhesive and granules to cure the impregnating resin and the making coat.

3. A method of manufacturing a composite abrasive article which comprises coating a sheet of vulcanized fibre backing material with a thin layer of heat-hardenable urea resin in highly mobile liquid condition, joining said coated layer on its coated side with a layer of unsized cloth at a multiplicity of closely spaced points, heating the combination sheet to dry and cure the resin, and thereby attach the cloth and fibre material to each other so firmly that the combination backing material can be put through the subsequent coating operations without substantial separation of the cloth and fibre, impregnating the cloth side of the combination sheet with a phenolic resin in thin liquid condition so that the liquid resin flows into intimate contact with the vulcanized fibre, heating the impregnated combination sheet to dry the impregnating resin, applying abrasive grains and a making coat, of a phenolic resin adhesive therefor to the impregnated cloth, drying said making coat and curing the impregnating resin and the making coat.

4. A method of manufacturing a composite abrasive article which comprises coating a sheet of vulcanized fibre backing material with a thin layer of animal glue in liquid condition, joining said coated sheet on its coated side with a layer of unsized cloth at a multiplicity of closely spaced points, heating the combination sheet to set the glue, and thereby attach the cloth and fibre material to each other so firmly that the combination backing material can be put through the subsequent coating operations without substantial separation of the cloth and fibre, impregnating the cloth side of the combination sheet with a phenolic resin in thin liquid condition so that the liquid resin flows into intimate contact with the vulcanized fibre, heating the impregnated combination sheet to dry the impregnating resin, applying abrasive grains and a making coat of a phenolic resin adhesive therefor to the impregnated cloth, drying the making coat, and curing the impregnating resin and the making coat.

5. A method of manufacturing a composite abrasive article which comprises coating a sheet of vulcanized fibre backing material with a thin layer of a resorcinol formaldehyde resin, in a highly mobile liquid condition, joining said coated sheet to a layer of unsized cloth at a multiplicity of closely spaced points, heating the combined cloth and fibre to cause the resin to dry and become cured, and thereby attach the cloth and fibre material to each other so firmly that the combination backing material can be put through the subsequent coating operations without substantial separation of the cloth and fibre, impregnating the cloth side of the combination sheet with a resin in thin liquid condition, and in such quantity that the resin seeps through the cloth and provides the principal bond for attaching the cloth to the fibre in the finished article, heating the impregnated combination backing to dry the impregnating resin, applying abrasive grains and a phenol resin binder therefor to the impregnated cloth, and curing the impregnating resin and the resin binder.

6. A flexible coated abrasive article comprising a thin layer of abrasive grains joined to a composite backing by a heat-hardened condensation product, said backing comprising a layer of vulcanized fibre joined to a phenolic resin impregnated cloth, said impregnating resin extending through the cloth and contacting the vulcanized fibre over a major portion of the interface and contributing the main adhesive force between the cloth and the vulcanized fibre, there being small amounts of urea-formaldehyde resin at a multiplicity of closely spaced points of contact of the cloth and the fibre and in the threads of the cloth adjacent such points.

7. In a method of making a multilayered backing material for abrasive articles comprising a layer of cellulose material and a layer of unsized cloth the steps which comprise applying a thin layer of a quick-setting adhesive to the cellulose material, pressing the layer of cloth onto the adhesive coated surface to join the cloth and cellulose material at a multiplicity of closely spaced points, setting the adhesive to form a composite backing in which the layers are attached so firmly that the backing can be put through the subsequent coating operations without substantial separation of the layers, and subsequently applying a coating of a different resinous material in thin liquid condition to the outer surface of the cloth in a quantity sufficient to seep through the cloth and fill the spaces between the cellulose material and those parts of the cloth not adhesively attached to the cellulose material by the first-mentioned adhesive.

8. A coated abrasive article comprising a multi-layered backing comprising a layer of hydrated cellulose material and a layer of unsized cloth, said celluose material being attached to the inner surface of the cloth by one adhesive at a multiplicity of closely spaced points and by a second and different adhesive between the said points, said cloth being filled with the said second adhesive, and a layer of abrasive grains adhesively attached to the outer surface of the cloth.

9. In the manufacture of a composite backing material for a flexible abrasive article in which the backing comprises an open unsized cloth and vulcanized fiber the steps which comprise first applying to the fiber 2-3 lbs. per sandpaper maker's ream of a mobile liquid adhesive, applying the cloth to the adhesive coated surface to adhesively join the cloth and fiber by attachment of the threads of the cloth which are in contact with the fiber by drawing some of the liquid to such threads thereby leaving parts of the fiber substantially uncoated with the liquid, solidifying the adhesive, and coating the cloth side of the combination backing thus formed with a resin in thin liquid condition in a quantity sufficient to fill the cloth and penetrate therethrough to provide an additional adhesive for attaching the cloth to the fiber at the previously uncoated parts of the fiber.

10. In the manufacture of abrasive coated articles on a backing comprising an open unsized cloth and vulcanized fiber, the steps which comprise first applying to the fiber about 2-3 lbs. per sandpaper maker's ream of a mobile liquid adhesive, applying the cloth to the adhesive coated surface to join the cloth and vulcanized fiber at a multiplicity of closely spaced points, solidifying the adhesive, coating the cloth side of the combination backing thus formed with a sufficient quantity of a phenolic resin in thin liquid condition to fill the cloth and penetrate therethrough to provide additional adhesive for attaching the cloth to the fiber, coating the cloth with abrasive grains and a resin binder therefor, and heat treating the coated article to harden the resins whereby the cloth is firmly attached to the fiber by the impregnating resin and the grains are attached to the cloth by the binder.

11. In the manufacture of abrasive coated articles on a backing comprising an open unsized cloth and vulcanized fiber, the steps which comprise first applying to the fiber about 2-3 lbs. per sandpaper maker's ream of a liquid urea resin adhesive in mobile condition, applying the cloth to the adhesive coated surface to join the cloth and vulcanized fiber at a multiplicity of closely spaced points, curing the urea resin, coating the cloth side of the combination backing thus formed with a sufficient quantity of a phenolic resin in thin liquid condition to fill the cloth and penetrate therethrough to provide additional adhesive for attaching the cloth to the fiber, coating the cloth with abrasive grains and a resin binder therefor, and heat treating the coated article to harden the resins whereby the cloth is firmly attached to the fiber by the impregnating resin and the grains are attached to the cloth by the binder.

12. In the manufacture of abrasive coated articles on a backing comprising an open unsized cloth and vulcanized fiber, the steps which comprise first applying to the fiber about 2-3 lbs. per sandpaper maker's ream of a liquid urea resin adhesive in mobile condition, applying the cloth to the adhesive coated surface to join the cloth and vulcanized fiber at a multiplicity of closely spaced points, curing the urea resin, coating the cloth side of the combination backing thus formed with 12-20 lbs. per sandpaper maker's ream of a phenolic resin in thin liquid condition to fill the cloth and penetrate therethrough to provide additional adhesive for attaching the cloth to the fiber, coating the cloth with abrasive grains and a phenolic resin binder therefor, and heat treating the coated article to harden the resins whereby the cloth is firmly attached to the fiber by the impregnating resin and the grains are attached to the cloth by the binder.

HALSEY W. BUELL.